United States Patent
Bernus et al.

(10) Patent No.: US 10,551,266 B2
(45) Date of Patent: Feb. 4, 2020

(54) FLIGHT PARAMETER MEASURING DEVICE WITH OPTICAL DEFORMATION SENSORS CARRIED BY THE RADOME OF AN AIRCRAFT

(71) Applicants: Airbus Operations SAS, Toulouse (FR); Airbus SAS, Blagnac (FR)

(72) Inventors: Christophe Bernus, Toulouse (FR); Jean Redon, Toulouse (FR); Alain Fontaine, Toulouse (FR); Thomas Boisson, Lagardelle sur Leze (FR); Nathalie Esteve, Leguevin (FR); Cécile Poret, La Salvetat Saint Gilles (FR); Andrei Bulancea, Colomiers (FR)

(73) Assignees: AIRBUS OPERATIONS SAS, Toulouse (FR); AIRBUS SAS, Blagnac (FR)

(*) Notice: Subject to any disclaimer, the term of this patent is extended or adjusted under 35 U.S.C. 154(b) by 130 days.

(21) Appl. No.: 15/728,979

(22) Filed: Oct. 10, 2017

(65) Prior Publication Data
US 2018/0100776 A1 Apr. 12, 2018

(30) Foreign Application Priority Data
Oct. 10, 2016 (FR) ..................... 16 59732

(51) Int. Cl.
*G01L 11/02* (2006.01)
*B64C 1/36* (2006.01)
(Continued)

(52) U.S. Cl.
CPC .............. *G01L 11/025* (2013.01); *B64C 1/36* (2013.01); *B64D 43/02* (2013.01); *G01C 23/00* (2013.01);
(Continued)

(58) Field of Classification Search
CPC ......... G01L 11/025; G01L 19/04; B64C 1/36; B64D 43/02; G01C 23/00; G01P 5/02; G01P 5/001; G01P 13/0006; G01P 13/025
See application file for complete search history.

(56) References Cited

U.S. PATENT DOCUMENTS 5,896,191 A * 4/1999 Beier .................... G01B 21/32
250/227.16
6,038,932 A * 3/2000 Wandel ................... G01P 5/165
73/182

(Continued)

FOREIGN PATENT DOCUMENTS

CN 103913592 7/2014

OTHER PUBLICATIONS

French Search Report, dated Jan. 17, 2017, priority document.

*Primary Examiner* — Harshad R Patel
*Assistant Examiner* — Nigel H Plumb
(74) *Attorney, Agent, or Firm* — Greer, Burns & Crain, Ltd.

(57) ABSTRACT

A device measures a flight parameter of an aircraft which has a radome. Systems measure the deformation of a wall of the radome due to forces exerted by the air on the radome. A computer computes the flight parameter from deformation measurements obtained by the systems. The systems have an optical fiber carried by the radome provided with Bragg gratings. Each fiber has a plurality of Bragg gratings distributed over a length of the fiber so as to distribute the Bragg gratings over the radome when the fiber is installed.

15 Claims, 9 Drawing Sheets

(51) Int. Cl.
*B64D 43/02* (2006.01)
*G01C 23/00* (2006.01)
*G01L 19/04* (2006.01)
*G01P 5/02* (2006.01)
*G01P 13/00* (2006.01)

(52) U.S. Cl.
CPC ............... *G01L 19/04* (2013.01); *G01P 5/02* (2013.01); *G01P 13/0006* (2013.01)

(56) References Cited

U.S. PATENT DOCUMENTS

| | | | | |
|---|---|---|---|---|
| 6,107,976 A * | 8/2000 | Purinton | ................ | H01Q 1/42 343/872 |
| 2012/0279313 A1* | 11/2012 | Diatzikis | ................... | G01P 5/02 73/861 |
| 2014/0229139 A1* | 8/2014 | Hegenbart | .............. | G01P 5/001 702/144 |
| 2015/0329216 A1* | 11/2015 | Laurens | ................ | B64D 43/02 701/6 |

* cited by examiner

FLIGHT PARAMETER MEASURING DEVICE WITH OPTICAL DEFORMATION SENSORS CARRIED BY THE RADOME OF AN AIRCRAFT

CROSS-REFERENCES TO RELATED APPLICATIONS

This application claims the benefit of the French patent application No. 1659732 filed on Oct. 10, 2016, the entire disclosures of which are incorporated herein by way of reference.

BACKGROUND OF THE INVENTION

The present invention concerns a device for measuring flight parameters of an aircraft and more precisely the airspeed, sideslip angle and angle of attack of the aircraft including at least one optical sensor placed at the level of the radome. It also concerns the aircraft incorporating a measuring device of this kind.

The measurement of flight parameters such as airspeed is commonly effected with the aid of a Pitot tube, in particular. The Pitot tube is a device taking the form of a tube in which a flow of air is contained and leads to a pressure increase measured by a differential pressure gauge. The pressure gauge also receives the measured surrounding pressure from another port mounted on the fuselage and deduces the airspeed of the aircraft from this by computation.

The document U.S. Pat. No. 6,038,932 discloses an aircraft provided with a pressure measuring device of the above kind for obtaining the airspeed and the altitude of the aircraft. The document emphasizes the disadvantages of the Pitot tube such as, for example, imperfect operation of the Pitot tube in the case of excessive angles of attack. The basic idea of the document in question is to alleviate these disadvantages and notably at extreme angles of attack by placing the Pitot probes at the level of the radome, i.e., directly in the flow of air.

The document US2015329216 discloses a device for determining the airspeed of the aircraft from sensors placed on the radome enabling measurement of the deformation and deduction of the airspeed from the latter. However, the electrical cables that are positioned between the radar and the sensors can have an impact on the radio-frequency performance of the radar.

The document US2014/0229139 reveals a device for determining the airspeed of the aircraft from the deformation measured by sensors placed on the tail or the wing but not the radome which has a very particular configuration.

The document CN103913592 describes a device for measuring the speed and the direction of the wind using a fiber optic detector and whose only application is surveillance of a meteorological environment.

An object of the present invention is to propose a device making it possible to offer an alternative to the use of a Pitot probe having the disadvantage of imperfect operation in the event of excessive angles of attack as revealed in the cited prior art or in the event of icing up, etc.

SUMMARY OF THE INVENTION

To this end, the present invention discloses a device for measuring at least one flight parameter such as the airspeed, the sideslip angle or the angle of attack, or any other parameter dependent thereon, of an aircraft including a radome, including systems for measuring the deformation of the wall due to the forces exerted by the air on the radome and a computer for computing from deformation measurements obtained by the systems, the required flight parameter or parameters, characterized in that the systems include at least one optical fiber carried by the radome provided with Bragg gratings, each fiber including a plurality of Bragg gratings distributed over the length of the fiber so as to distribute them over the radome when the fiber is installed.

The system having no Pitot probes, it therefore avoids all the disadvantages stemming from their use.

The measuring device has at least one of the following optional features, separately or in combination.

The measuring device includes at least one additional fiber intended for the measurement of the temperature.

The fiber or a part thereof is disposed on the internal face of the wall of the radome.

The fiber is integrated into the interior of the wall of the radome.

A block of foam is provided at the level of at least one Bragg grating intended to measure the deformation, between skins of the wall of the radome so as to join them.

The measuring device includes a system for isolating from mechanical stresses at least one Bragg grating.

The isolating system comprises a sliding envelope provided around the Bragg grating or gratings.

The sliding envelope is inserted between the skin and the block of foam.

The sliding envelope is fixed to the exterior surface of the wall at the level of the block of foam.

The envelope is positioned as close as possible to the Bragg grating associated with the block of foam.

The isolating system comprises a sample of skin superposed on the wall of the radome on which the Bragg grating is disposed to decouple it from the mechanical deformation.

The present invention also relates to a method of measuring at least one flight parameter such as the airspeed, the sideslip angle or the angle of attack or any other parameter depending thereon of an aircraft including a radome, including:

a step of measurement of deformation of the wall stemming from the forces of the air on the radome using at least systems carried by the radome enabling measurement of the deformation of the wall;

a step of computation by means of a computer for computing from deformation measurements obtained by the systems, the required flight parameter or parameters, characterized in that the systems comprising at least one optical fiber carried by the radome provided with Bragg gratings, each fiber including a plurality of Bragg gratings distributed over the length of the fiber so as to distribute them over the radome when the fiber is installed, the method includes:

a step of measurement of the temperature at the level of the Bragg gratings and a step of compensation of the deformation measurement with the aid of the measured temperature;

a step of measurement of the temperature difference between the interior and the exterior of the radome, and a step of compensation of the measurement of the deformation with the aid of the measured temperature difference.

The measuring method has at least one of the following optional features separately or in combination.

It includes a step of measurement of the deformation at the level of a sample carrying a Bragg grating and a step of compensation of the deformation measurement with the aid of the deformation measurement at the level of the sample.

It includes a step of measurement of the pressure difference between internal pressure of the radome and the static pressure and a step of compensation of the measurement of the deformation with the aid of the measured pressure difference.

The present invention also concerns an aircraft radome carrying at least one optical fiber provided with systems enabling measurement of the deformation of the wall of the radome stemming from forces applied to the radome by the air.

BRIEF DESCRIPTION OF THE DRAWINGS

Other aims, advantages and features of the invention will become apparent on reading the following description of the measuring device according to the invention given by way of nonlimiting example with reference to the appended drawings, in which.

DETAILED DESCRIPTION OF THE PREFERRED EMBODIMENTS

Figure 1:
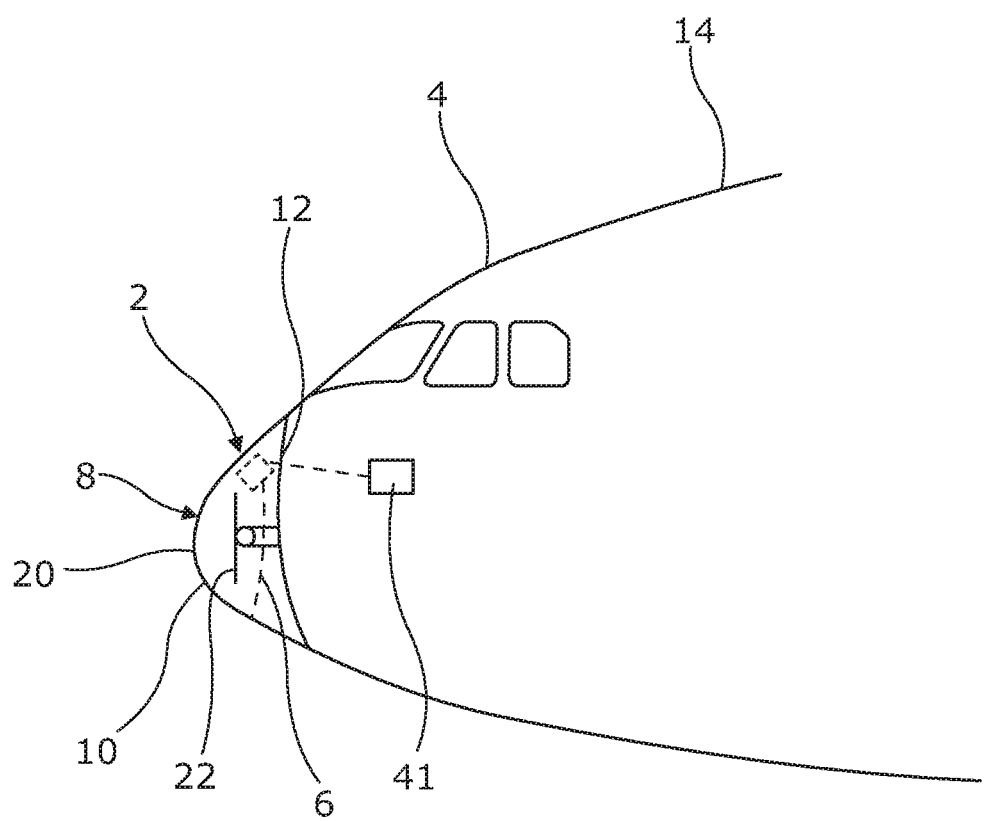
FIG. 1 is a simplified diagrammatic view in lateral section of a nose of an aircraft according to the present invention.

As FIG. 1 shows, the present invention relates to a device 2 for measuring flight parameters of an aircraft 4 such as the airspeed, the sideslip angle and the angle of attack of the aircraft. The aircraft 4 includes a radome 8. The measuring device 2 includes at least one optical fiber 6 disposed at the level of the radome 8 of the aircraft to measure the deformation thereof. When the aircraft 4 is in flight, the air exerts forces on the exterior surface of the wall of the radome 8 liable to lead to deformation thereof. The deformations of the radome 8 are proportional to the mechanical stresses to which it is subjected: it is therefore possible by measuring the deformations to deduce therefrom the aerodynamic forces and to compute from the forces the airspeed of the aircraft and the angle of attack and sideslip.

As shown in FIGS. 1 and 3 to 6, the radome 8 includes a wall 10 situated at the front end of the aircraft 4 at the level of the nose. The wall 10 has a double curvature so as to form a dome-shaped concavity. The free peripheral edge 12 of the radome is joined to the rest of the fuselage 14 of the aircraft, generally in an articulated manner, by any known type of means and, for example, by fittings 15. The wall 10 has an internal face 16 and an external face 18 and an end forming the apex 20 of the dome opposite the edge 12. The hollow shape of the radome 8 makes it possible to protect antennas 22 accommodated inside the latter. The radome also includes a lightning protection system in the form of metal strips 24, for example.

The wall 10 of the radome 8 is made from a material permeable to electromagnetic waves.

Figure 2A:
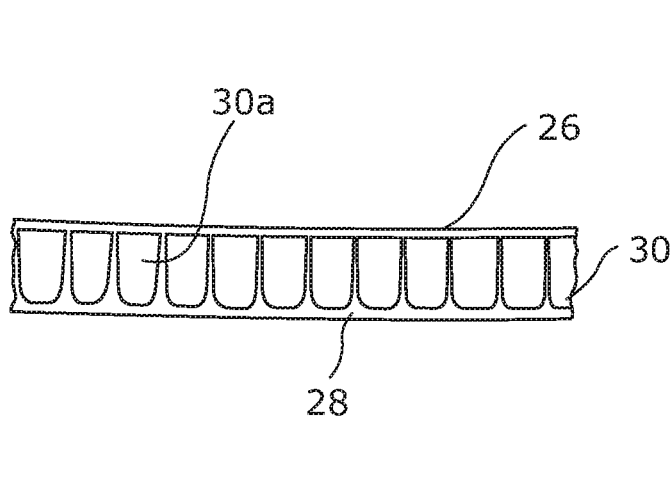
FIGS. 2a and 2b are respectively sectional views of a radome wall segment of composite and honeycomb structure with one layer and two layers.
Figure 2B:
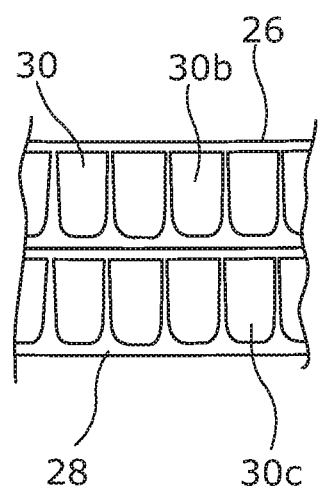

The wall 10 has a sandwich structure including two skins 26, 28 comprising, for example, composite material disposed on respective opposite sides of a honeycomb or foam core 30. The composite material comprises, for example, a reinforcement in fiber such as glass fibers, quartz fibers, "KEVLAR" fibers (registered trade mark) or any other dielectric material and a thermosetting or thermoplastic organic resin matrix. The structure may be a single sandwich structure, i.e., a layer 30a of honeycomb or foam (as shown in FIG. 2a), a double sandwich structure, i.e., two layers 30b, 30c (as shown in FIG. 2b), or even a multiple-layer structure. The external surface of one of the skins 26, 28 corresponds to the internal face 16 and the external surface of the other skin corresponds to the external face 18.

The properties of the wall such as the thickness of each of the skins, of the core, the dielectric properties of the material, etc. are chosen in an optimized manner to improve the transmission of electromagnetic waves.

The use of strain gauges to measure a deformation necessitates the introduction of electrical wires at the level of the radome 8 that interfere with radio transmission via the antennas 22 and notably the radar, or even attract lightning Optical fiber on the other hand is a dielectric material. Therefore, the use of the optical fiber 6 to measure the deformation of the radome makes it possible to avoid any impact on the radio-frequency performance of the radar or performance in terms of lightning resistance.

There exist different technologies for measuring a deformation of a wall using an optical fiber such as, for example, Bragg grating measurement.

Bragg grating measurement is widely known. The Bragg grating is a modification within a part of the optical fiber creating a particular microstructure featuring a periodic variation of the refractive index making it possible to reflect only a particular wavelength of a light signal directed into the fiber in question. The grating serves as a selective filter. A modification of the shape of the fiber leads to a modification of the wavelength reflected and the deformation can be deduced from this modification. Temperature also influences the wavelength reflected by the Bragg grating. A plurality of dispersed Bragg gratings can be provided on the same fiber enabling multiple measurements using the same fiber.

Figure 5:
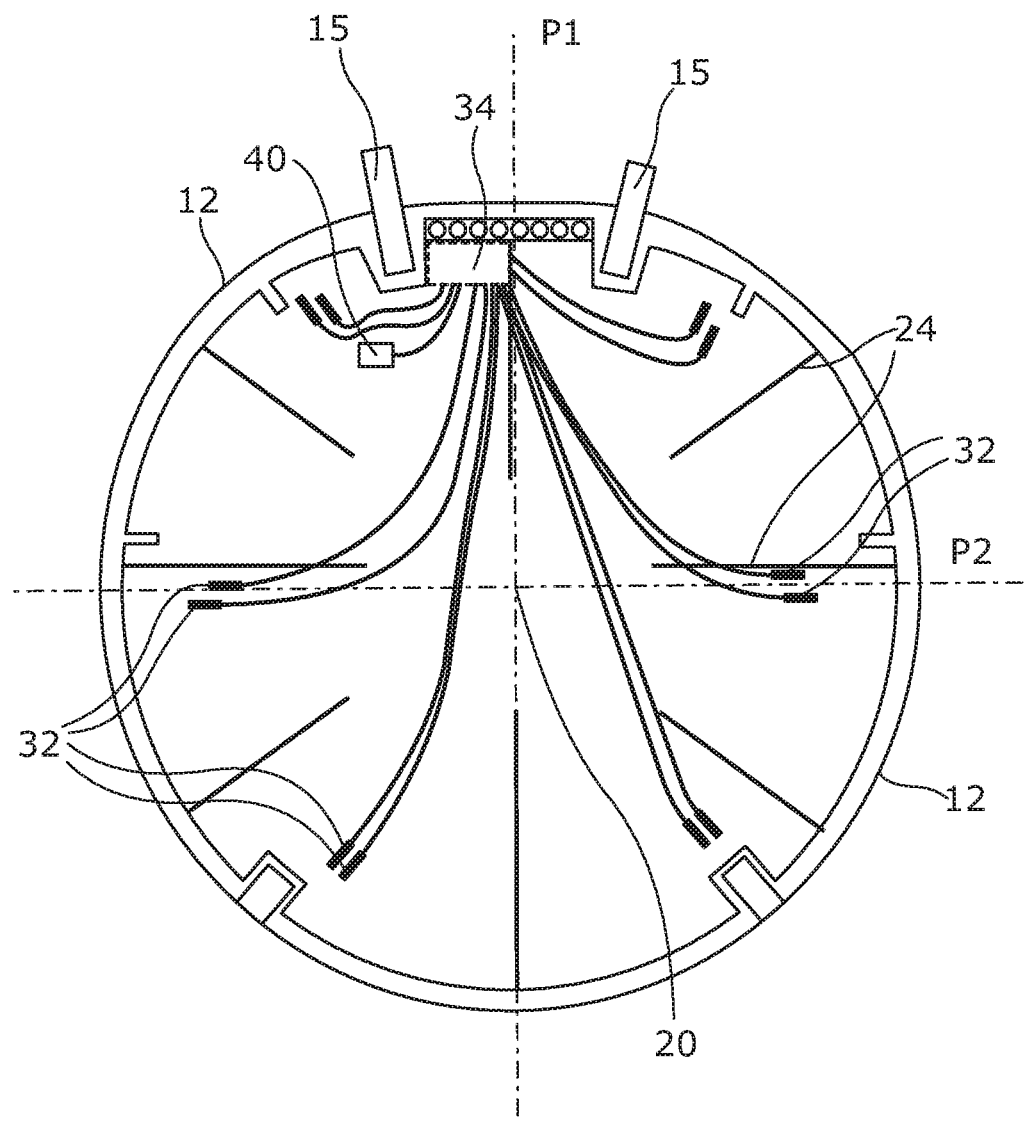
Figure 6:
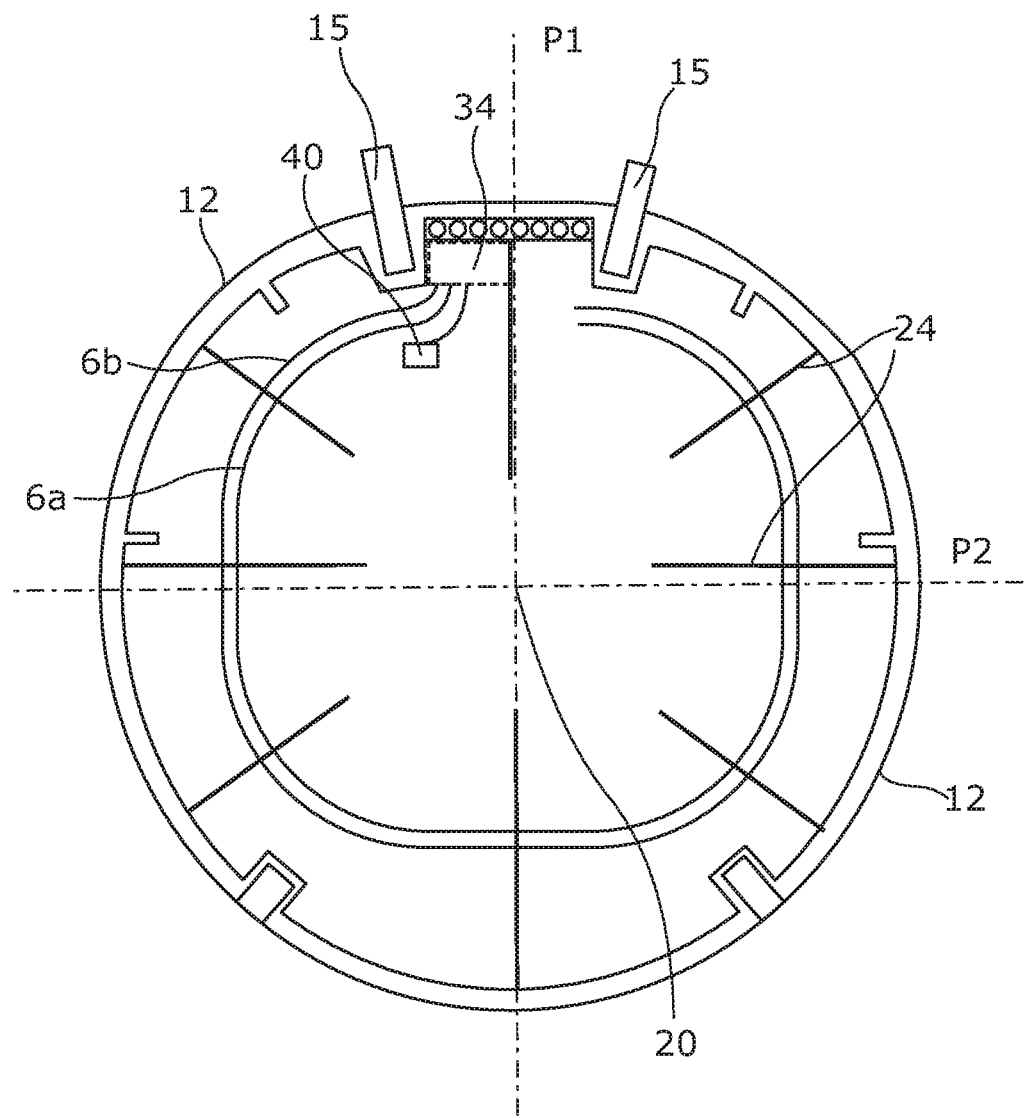

Other types of known technology can also be used to measure the deformation with the aid of an optical fiber such as interferometric measurement at the fiber end (shown in FIG. 5) or Ramann or Brillouin type distributed measurement (shown in FIG. 6). The measuring device can also use a combination of different technology systems, for example, Bragg gratings and interferometric systems.

The following description refers to the Bragg grating technology but, as indicated above, any other technology or combination of technologies can be applied in connection with an optical fiber to enable the measurement of deformation.

Figure 3:
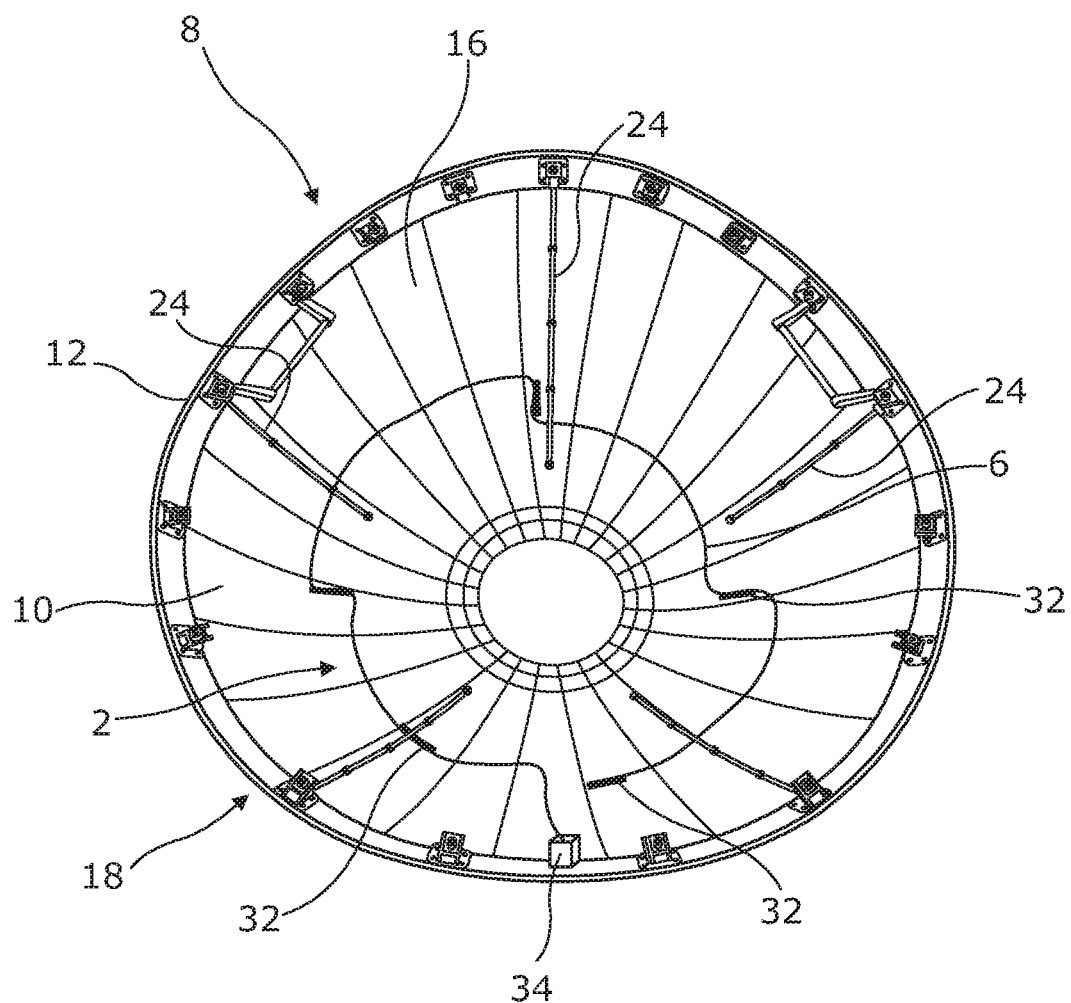
FIG. 3 is a view of the interior of the radome showing a fiber of the measuring device according to the present invention.
Figure 4:
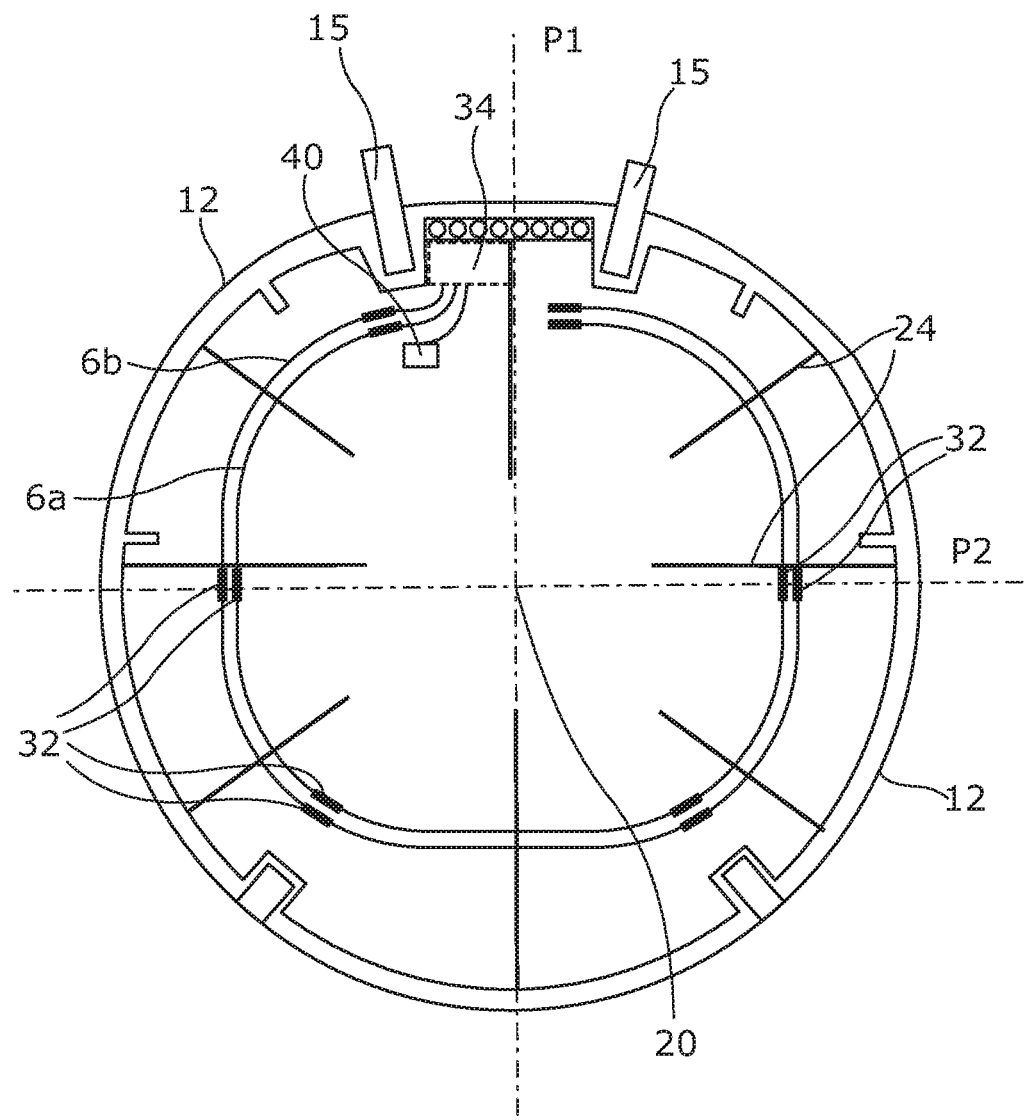
FIGS. 4 to 6 are respectively simplified diagrammatic views of the interior of the radome showing Bragg grating, interferometric and distributed measuring devices according to the invention.

As FIGS. 1 and 3 to 6 show, the optical fiber 6 is disposed at the level of the radome between the apex 20 and the peripheral free edge 12 over the perimeter of the radome. In the embodiment shown in FIGS. 1, 3, 4 and 6, only one optical fiber 6 is provided for measuring the deformation, but a plurality of fibers could be provided. For example, there can be provision for using a plurality of fibers to palliate failure of one or more of them or if a single fiber would not be sufficient to allow a sufficient number of Bragg gratings, or in the case of a technology such as fiber end measurement as shown in FIG. 5. Everything described hereinafter for one fiber is applicable to a plurality of fibers. In the case of the use of a single fiber 6, the latter is positioned so as to be able to detect a deformation over the whole of the surface of the radome. In the embodiment shown, the fiber is neither located too close to the edge 12 nor too close to the apex 20. On all the segments joining the edge 12 to the apex 20, the fiber 6 is positioned along between one third and two thirds of the segment. According to another embodiment that is not shown, a single fiber 6 forms a spiral on and/or inside the wall of the radome: the fiber can pass through the interior skin of the radome and thus be both on and inside the wall.

According to one alternative, whether there is one fiber or a plurality of fibers, the fiber or each fiber is positioned on a segment of the radome joining the edge 12 to the apex 20. According to another alternative, whether there is one fiber or a plurality of fibers, the fiber or each fiber is wound on the interior surface of the radome, for example, by following, as before, a spiral shape or a circumferential line. According to one possible embodiment, one or more fibers 6 are positioned on the rear half of the interior surface of the radome, namely closer to the edge 12 than the apex 20, or at equal distances so as to reduce the risk of damage by hail, bird strikes, etc. According to one embodiment, the number of fibers is large and, for example, greater than ten.

As shown in FIG. 3, the fiber 6 features a plurality of Bragg gratings 32 distributed so as to distribute them over the radome when the fiber is installed. In the embodiment shown, one of the ends of the fiber 6 includes a Bragg grating and the other end is connected to an interrogator 34. Other gratings are distributed over the length of the fiber between the two ends. The function of the interrogator 34 is to convert the light signal sent back by the Bragg gratings into wavelength information.

In the embodiment shown in FIG. 4, temperature being a parameter that can influence the measurement, two optical fibers 6 are provided: one 6a dedicated to the measurement of deformation, the other 6b dedicated to the measurement of temperature. As indicated above, for each of these deformation and temperature measurements, a respective plurality of fibers could also be provided. According to another possible embodiment, a single fiber with a plurality of Bragg gratings can be used. The Bragg gratings are disposed over a part of the length thereof for the measurement of deformation and over another part of the length for the measurement of temperature.

Figure 7:
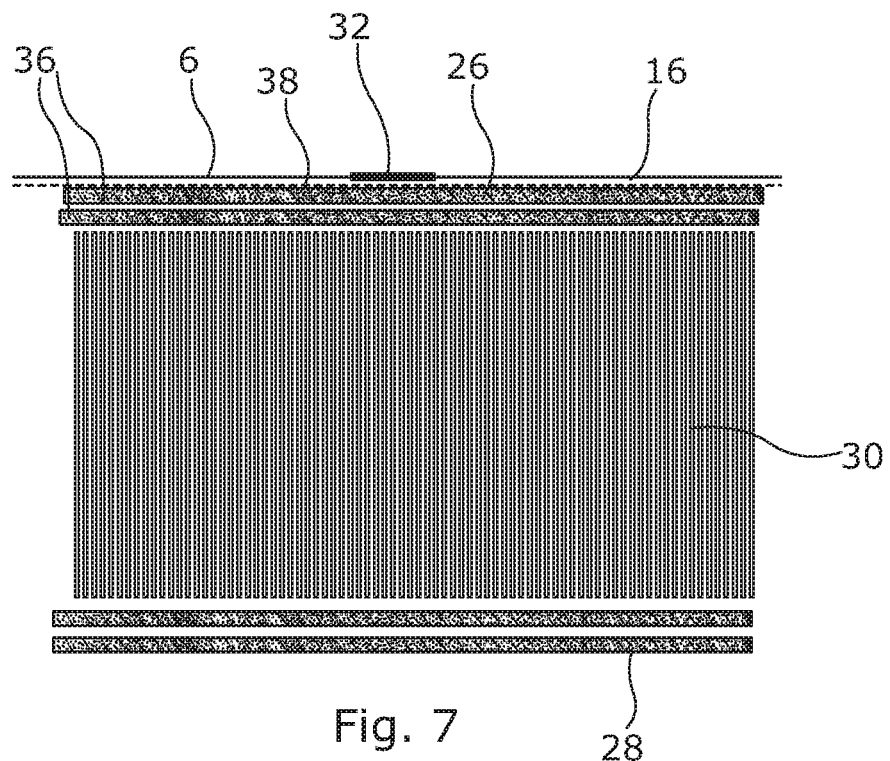
FIGS. 7 and 8 are respectively simplified views in lateral section of a radome wall segment showing a fiber of the measuring device installed on the radome wall and inside the latter.

According to the embodiment shown in FIG. 7, the fiber 6 is placed on the internal face 16 of the radome. Only shown are two plies 36 of the composite skin 26 on which the fiber 6 is disposed. The fiber 6 is fixed by any type of means to the skin 26 and more precisely to the outermost ply of the skin. The fiber 6 can be glued to the skin 26, for example. The film 38 of glue is represented by a dashed line in FIG. 7.

Figure 8:
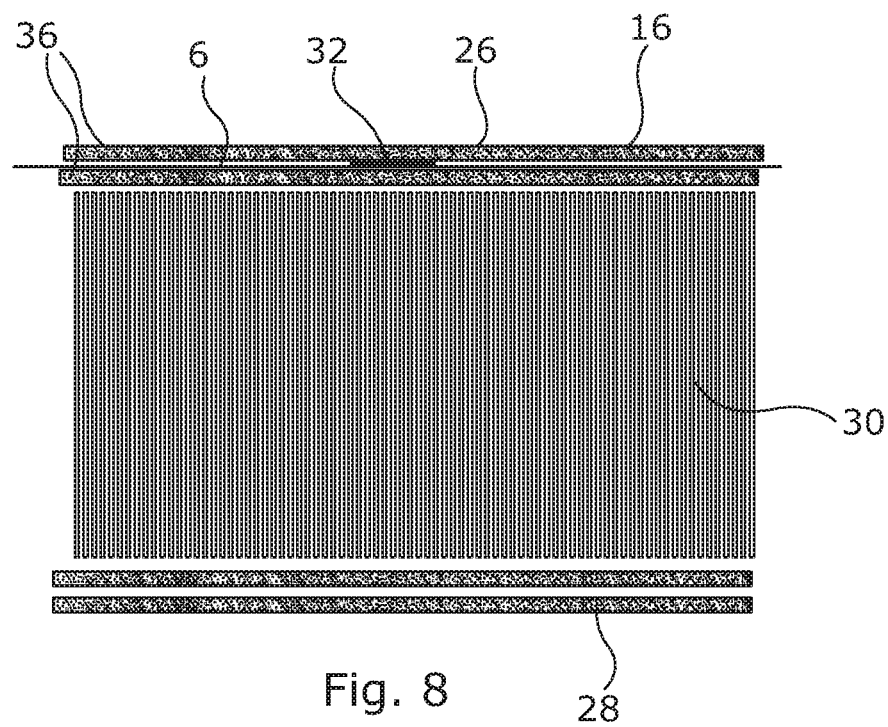

According to another embodiment shown in FIG. 8, the fiber 6 is inserted between two plies 36 of the skin 26. Here the skin 26 corresponds to the skin located on the side of the internal face 16. According to another embodiment, the fiber can be interleaved between two plies 36 of the skin 28, i.e., on the side of the external face 18. The fiber 6 is integrated into the skin 26 at the time of fabrication of the skin. The advantage of this embodiment is the absence of disturbances stemming from the film 38 of glue in the measurement of the deformation. The fact of integrating the fiber inside the skin 26 of the radome wall 10 enables direct measurement of the deformation of the latter.

In the case of composite skins 26, 28 and a honeycomb core 30, the honeycomb core 30 is impacted differently along a honeycomb cell by the mechanical stresses stemming from forces exerted by the external flow of air. There appears within the same cell a difference of deformation between the center and the perimeter of the cell. In order to homogenize the deformation received by a Bragg grating 32, the honeycomb is locally replaced with foam at the level of the grating 32 in question. As shown by way of illustration in FIG. 9, a block 39 of foam is inserted in the honeycomb core 30 locally under Bragg gratings 32 intended for the measurement of the deformation of the wall and, for example, under all of these gratings 32. The block 39 has a thickness identical to that of the honeycomb core 30 so as to join the skins 26 and 28 of the wall 10 of the radome 8 and extend locally around the Bragg grating 32 concerned over an area slightly greater than the latter so as to project beyond the entire periphery of the grating. The block 39 therefore forms a cylinder, a cube or any other geometric shape enabling homogenization of the deformation reaching the Bragg grating 32 concerned.

In the embodiment shown in FIG. 4 the Bragg gratings 32 are distributed symmetrically relative to a central vertical plane P1 of the radome passing through the apex 20 (when installed on the aircraft on a horizontal surface such as the ground). In the example, six Bragg gratings 32 are provided on each of the fibers 6a and 6b, three on each side of the plane P1. Moreover, there are two Bragg gratings 32 at the level of a central horizontal plane P2 perpendicular to the vertical plane and passing through the apex 20 and the other gratings on either side of that plane P2.

According to one embodiment, the gratings 32 are distributed so as to be at the same distance from one another.

The Bragg gratings 32 are generally distributed over the radome 8 in an optimized manner to measure the deformation of the whole of the radome wall 10.

As described hereinafter, to measure the sideslip angle or the angle of attack it is necessary to provide Bragg gratings 32 distributed on respective opposite sides of the plane P1 and/or P2 to measure the two angles.

A pressure sensor 40 is provided inside the radome to measure the pressure as is necessary for the determination of the airspeed.

A computer 41 onboard and inside the aircraft (inside or outside the radome) is connected to the interrogator 34 and to the sensor 40. It is also connected to aircraft static pressure sensors of known type, not shown; it receives from them wavelength information from which it is possible to deduce deformation information and pressure information (interior pressure measured by the sensor 40 and static pressure obtained by means of the static pressure sensors) and converts them into airspeed information.

To clarify, by "mechanical deformation" is meant the deformation of a wall due to mechanical stresses due to the forces exerted by the air on the wall of the radome.

Temperature influences the Bragg grating (see above); for example it leads, in particular, to deformation thereof specific to the temperature change. The influence of the temperature causes a wavelength shift. If one or more Bragg gratings are intended for the measurement of the mechanical deformation, the wavelength offset due to the change of temperature renders the measurement of the mechanical deformation erroneous. It is therefore indispensable to compensate the measurement of mechanical deformation by the measurement of the deformation due only to the change of temperature to subtract the effects thereof. To do this it is necessary to separate the effect of the mechanical deformation from that due to the change of temperature: two methods for separating the effects are possible and shown in FIGS. 10 and 11, respectively.

In the first method shown in FIG. 10, there are effected a measurement of the mechanical deformation influenced by the temperature, referred to hereinafter as the raw mechanical deformation, and a measurement of the temperature not influenced by the mechanical deformation of the wall, and the deformation is deduced therefrom by deducting from the impact of the measured temperature the raw mechanical deformation. To do this, the Bragg grating or gratings 32 of the fiber or fibers for measuring the temperature is or are encapsulated in a sliding envelope so that this grating or these gratings is or are not impacted by the deformation of the wall to which the fiber is fixed. The fact of providing a sliding envelope enables decoupling of the Bragg grating from the wall. This method therefore comprises dissociating the Bragg grating or gratings for measuring the temperature from mechanical deformations that interfere with that measurement. By way of illustration, the Bragg grating is in a tube 42 comprising a material sufficiently slippery to isolate the Bragg grating or gratings concerned from the mechanical deformations of the wall. The tube 42 can, for example, comprise a material such as "TEFLON" (registered trade mark) or a combination with another plastic offering a stiffness higher than that of "TEFLON" (registered trade mark), "TEFLON" (registered trade mark) contributing non-stick properties.

The tube makes it possible to separate the fiber and, more particularly, the Bragg grating from the skin 26 and its deformations. The Bragg grating therefore measures the temperature without being subject to the influence of the deformations of the skin 26. The knowledge of the temperature enables correction of the temperature-dependent deformation information.

Figure 9:
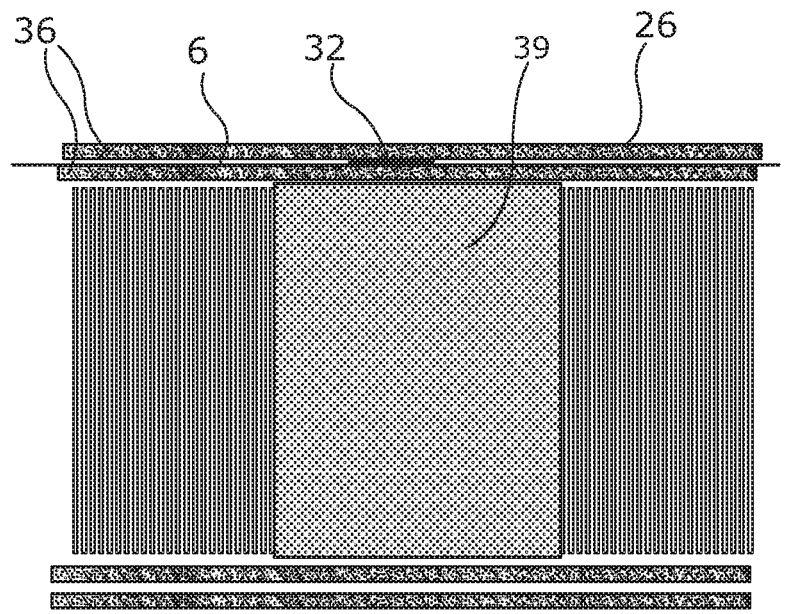
FIG. 9 is a simplified view in lateral section of a radome wall segment showing a fiber of the measuring device installed on the interior of the radome wall and in which a system for homogenization of the mechanical deformations is provided.
Figure 10:
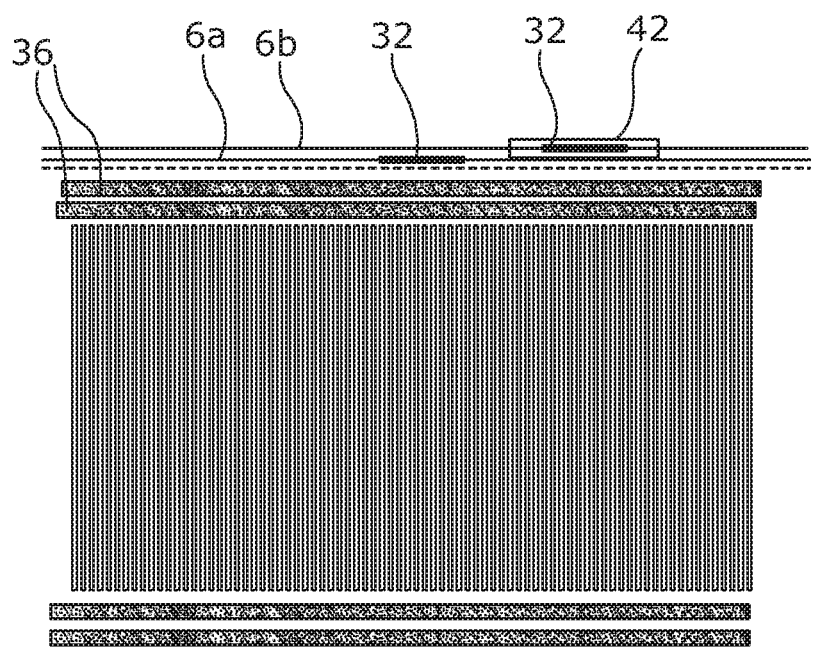
FIGS. 10 and 11 are simplified views in lateral section of a radome wall segment showing a fiber of the measuring device provided with means for decoupling a fiber relative to the mechanical deformations of the radome wall so as to measure only the effects caused by temperature.
Figure 10A:
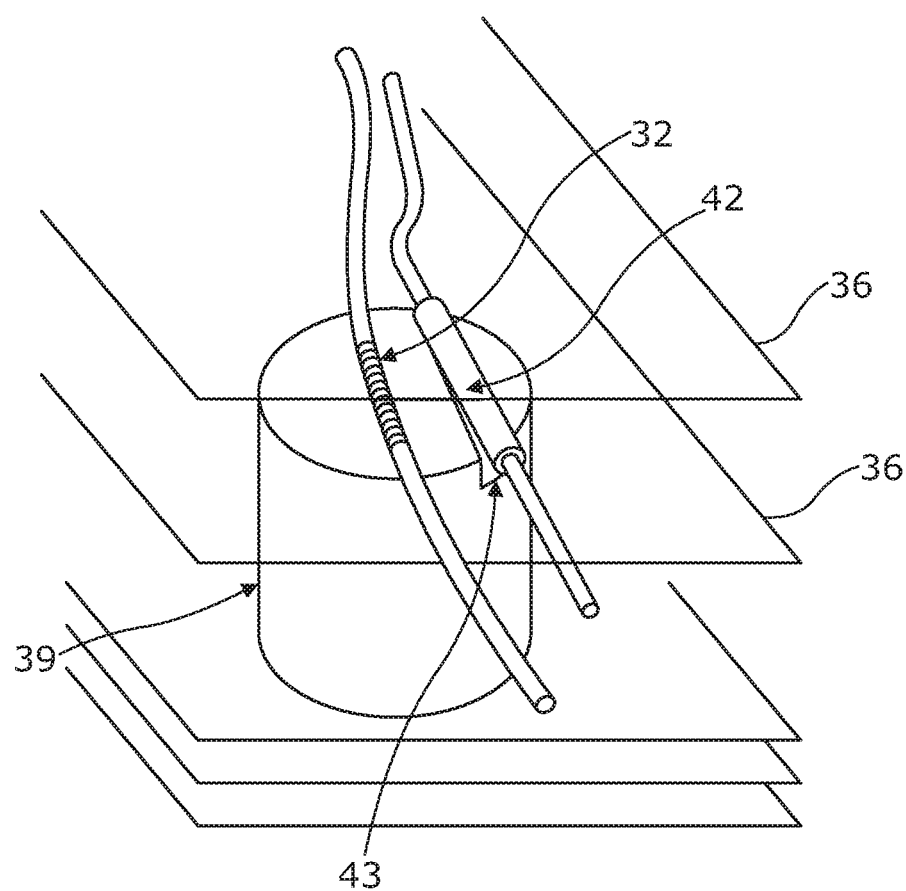
FIG. 10a is a simplified perspective view of a radome wall segment showing a fiber of the measuring device provided with means for decoupling a fiber relative to the mechanical deformations of the radome wall installed inside the radome wall and in which a system for homogenization of the mechanical deformations is provided.

FIG. 10a shows an embodiment in which the fiber incorporating the Bragg gratings 32 is interleaved between two plies 36 of the skin 26. The Bragg grating 32 coupled to the block 39 described with reference to FIG. 9 is disposed at the level of the latter so that it can perform its homogenization function. The temperature measuring fiber with its gratings encapsulated in sliding envelopes 42 is disposed between the block 39 and the skin 26 to avoid having to fix it by gluing or otherwise. Its disposition suffices to retain it in place but this does not rule out an additional method of fixing. The sliding envelope is positioned as close as possible to the aforementioned Bragg grating 32 to produce the most accurate possible measurement. A housing 43 can be provided in the block 39 to insert the measuring fiber 43 in.

The deformation corresponds to the variation of a length relative to that same length. The unit is the "microdeformation" i.e., one micron of deformation per meter of material.

$$\varepsilon = \text{deformation} = \delta l / l$$

To obtain the mechanical deformation measurement not influenced by temperature, called the compensated mechanical deformation, it suffices to subtract from the raw mechanical deformation measurement the value of the deformation due only to temperature, called expansion deformation, namely the value of the expansion specific to the material that is obtained with the aid of the encapsulated Bragg grating decoupled from the wall:

$$\varepsilon i \text{ comp} = \varepsilon i \text{ raw} - \varepsilon i \text{ temp}$$

with
- $i$ corresponding to the number of the Bragg grating, conventionally referred to as a Bragg sensor;
- $\varepsilon i$ comp corresponding to the compensated mechanical deformation;
- $\varepsilon i$ raw corresponding to the raw mechanical deformation (read by the sensor glued or integrated into the skin);
- $\varepsilon i$ temp corresponding to the expansion deformation due to temperature.

The expansion deformation is obtained by multiplying the measurement of the temperature difference relative to a reference temperature by the coefficient of expansion of the material constituting the skin of the wall:

$$\varepsilon i \text{ temp} = \alpha(\text{tread}\_t0)$$

with
- $\alpha$ = coefficient of linear expansion of the material;
- tread = temperature read by the Bragg sensor;
- t0 = reference temperature (that at which the zero of any system is established).

In this first method, the expansion deformation is obtained by computation from the measured temperature (not impacted by the deformation).

Figure 11:
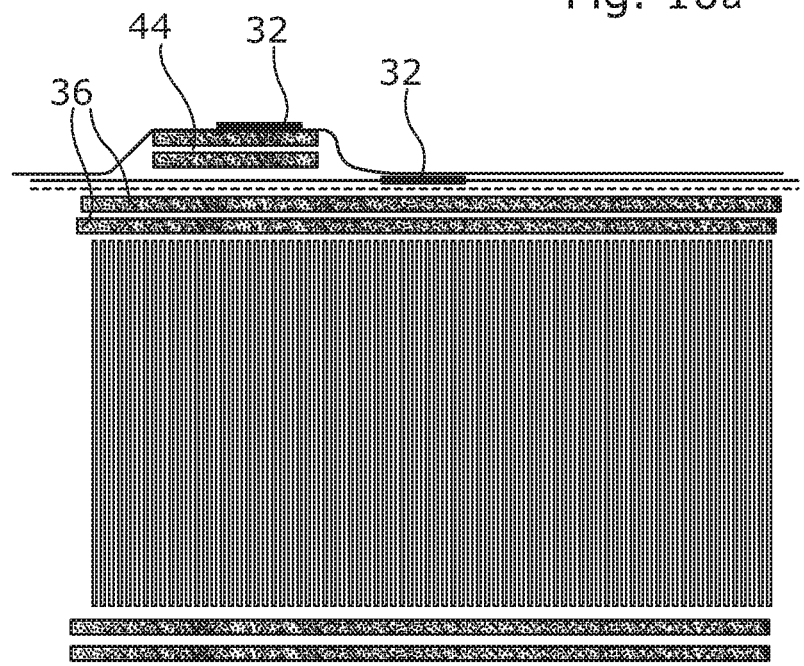

In the second method shown in FIG. 11 the expansion deformation is obtained by direct measurement. To do this, the deformation of a skin sample 44, termed a compensation sample 44, not influenced by the mechanical stresses that are applied to the wall and the raw mechanical deformation are measured to deduce from them the compensated mechanical deformation. To do this, in this embodiment, it suffices to subtract the expansion deformation measurement obtained by direct measurement with the aid of the compensation sample 44 from that of the raw mechanical deformation of the wall 10. As shown in FIG. 11, a sample 44 of the skin 26 is superposed on the wall 8 of the radome. The fiber 6 for measuring the mechanical deformation is supported both by the wall 8 of the radome and by the sample 44. Bragg gratings 32 are disposed at the level of the compensation sample 44 and at the level of the wall 8 in a sufficiently closely spaced manner to be at the same temperature. The Bragg grating or gratings 32 situated at the level of the sample 44 is or are dissociated from the wall 8 by the compensation sample 44: they are therefore not subjected to the raw mechanical deformations of the wall 8.

The expansion deformation εi temp is measured with the aid of the Bragg grating 32 fixed to the compensation sample 44. The compensated deformation is then obtained by subtracting it from the raw deformation measured by the Bragg grating 32 fixed to the wall:

$$\varepsilon i \text{ comp} = \varepsilon i \text{ raw} - \varepsilon i \text{ temp}$$

A compensation system has been described above able to alleviate the influence of temperature on the operation of the Bragg grating. The operation of the Bragg grating can be disturbed by another factor. When the aircraft is in flight and changes altitude very rapidly, the outside temperature falls or rises equally rapidly. Now the wall 8 of the radome proving to be a relatively good thermal insulator, equilibrium between the temperature outside and the temperature inside the radome is not immediate. There follows from this an increase in the temperature difference between the temperature outside and the temperature inside the radome. Now a temperature difference of this kind creates a mechanical stress that is not linked to that caused by the forces on the wall of the radome resulting from the airflow. It is also likewise necessary to compensate the measurement of the mechanical deformation of the wall relative to this temperature difference. To do this it is necessary to measure the temperature outside and the temperature inside the radome by any type of known means already present on an aircraft and to deduce therefrom the resulting deformation.

The deformation generated for each Bragg sensor and for a unit difference of temperature (i.e., one degree) at the level of a given Bragg sensor denoted $\varepsilon ti$ (i being the number of the Bragg sensor) can be estimated by means of a model of the structure of the radome (finite element model), stored in memory, and used proportionately to the temperature to compensate the deformation measurement.

$$\varepsilon i \text{ corrected} = \varepsilon i \text{ comp} - \varepsilon ti \times (text - tint)$$

with
  i corresponding to the number of the Bragg sensor;
  $\varepsilon i$ comp corresponding to the temperature-compensated mechanical deformation obtained previously with the aid of the method using computation (tube 42) or measurement (compensation sample 44);
  text corresponding to the temperature outside the radome;
  tint corresponding to the temperature inside the radome.

The finite element model of the structure of the radome is established by any type of known means.

In the same way as in the FIG. 10 embodiment, the deformation part due to the stresses resulting from the temperature difference between the inside and the outside of the radome is subtracted from the mechanical deformation.

Finally, the device also comprises all the means necessary to effect pressure compensation and, more precisely, to compensate the difference between the pressure inside the radome and the static pressure. This difference leads, in fact, to overestimation or underestimation of the deformations. A compensation principle similar to that for temperatures is employed.

The deformation generated for each Bragg sensor and for a unit difference (i.e., 1 mBar for example) between the internal pressure Pint and the static pressure Pstat at the level of a given Bragg sensor denoted $\varepsilon pi$ (i being the number of the Bragg sensor) can be estimated by means of a model of the structure of the radome (finite element model), the same as that used for the temperature compensation, stored in memory and used in a proportionate manner to the internal pressure difference to compensate the deformation measurement.

$$\varepsilon i \text{corrected} = \varepsilon i \text{comp} - \varepsilon pi \times (P\text{stat} - P\text{int})$$

with
  i corresponding to the number of the Bragg sensor;
  $\varepsilon i$ comp corresponding to the temperature-compensated mechanical deformation obtained previously with the aid of the method using computation (tube 42) or measurement (compensation sample 44);
  Pstat corresponding to the external static pressure;
  Pint corresponding to the pressure inside the radome.

According to the embodiment shown, the device performs temperature and pressure compensation and the final deformation is therefore:

$$\varepsilon i \text{ corrected} = \varepsilon i \text{ comp} - \varepsilon ti \times (text - tint) - \varepsilon pi \times (P\text{stat} - P\text{int})$$

Everything that has been described for the measurement system based on Bragg gratings (apart from the Bragg technology as such), the temperature compensation influencing the operation of the measuring system, the compensation of temperature and pressure difference inside and outside the radome can be applied to a measuring device using interferometric systems as shown in FIG. 5 or distributed measurements as shown in FIG. 6.

FIG. 5 shows a measuring device using interferometric systems. These interferometric systems 32 being placed at the fiber end, each system necessitates a fiber 6 connected to the interrogator 34. As FIG. 5 shows, the fiber end interferometric systems 32 could be disposed on the radome in the same way as the Bragg gratings and, in particular, in a distributed manner over the surface of the radome for an optimized and distributed measurement also on either side of the axes P1 and/or P2. In the embodiment shown, in the same way as for the Bragg grating set-up from FIG. 4, the device also provides a set-up with a fiber pair 6a, 6b, an interferometric system fiber for the measurement of deformation and an interferometric system fiber for the measurement of temperature.

In FIG. 6 the Ramann or Brillouin type measuring device distributes the measurements over the length of the fiber. The fiber or fibers 6 can therefore be disposed in the same manner as in the Bragg grating type measuring device, namely placed on the surface of the radome for an optimized measurement and so as to distribute the measurements on either side of the axes P1 and/or P2. In the embodiment shown and as in the set-ups shown in FIGS. 4 and 5 two distributed measurement fibers 6a and 6b are provided, one for measuring deformation, the other for measuring temperature.

It is possible to provide a measuring device combining two or more of these various fiber optic based deformation measurement technologies.

The measuring device 1 using a Bragg grating, interferometric system or distributed measurement method operates in the following manner.

The interrogator collects the various measurements transmitted by the Bragg gratings or interferometric systems or distributed systems and those coming from the compensation systems as described above, whether that refers to temperature or pressure compensation or compensation of the temperature difference between the inside and the outside of the radome 8.

From this the computer 41 deduces the various information regarding the deformation of the radome wall after effecting the compensation. The computer 41 sums the compensated deformation measurements. All of the compensated deformation measurements being proportional to the state of mechanical stress of the radome, this sum is an item of information proportional to the pressure difference between the internal face 16 and the external face 18 of the radome 8. Now according to the laws of Bernoulli, the pressure difference is dependent on the density of the air (itself dependent on the static pressure) and the square of the airspeed of the aircraft for a low Mach number below which the fluid is considered incompressible. In the case of a higher Mach number above which the fluid is considered compressible, the pressure difference is a slightly more complex function of the airspeed of the aircraft.

Accordingly, as the external pressure has been obtained and as it is also possible to measure the static pressure and the altitude by any known onboard type of means, and therefore the density of the air, the measuring device deduces therefrom the airspeed of the aircraft.

Figure 12:
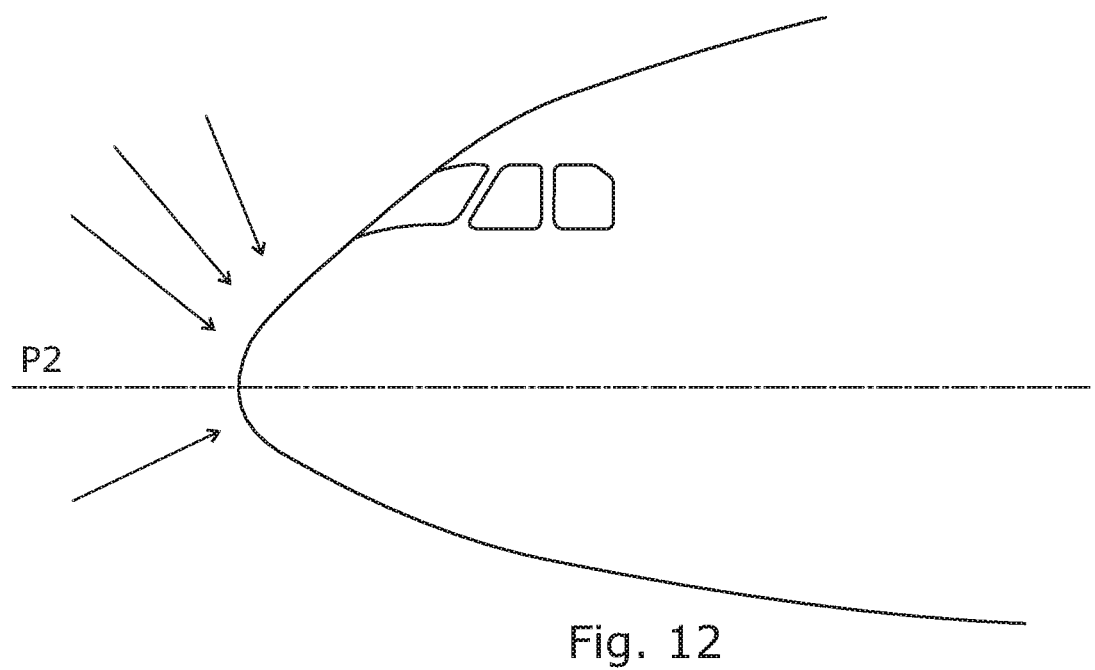
FIG. 12 is a simplified diagrammatic view in lateral section of a nose of an aircraft according to the present invention showing asymmetrical flows of air relative to a horizontal plane passing through the end of the radome.

To obtain the angle of attack, the fact is exploited of having distributed sensors (whether these are Bragg sensors, interferometric systems or distributed measurement systems (the sensors then being considered as distributed over a certain length of the fiber)) on either side of the plane P2. An asymmetric flow on either side of the plane P2 as shown by the arrows in FIG. 12 leads to asymmetric deformations that can be measured by the sensors because they are distributed on either side of the plane P2. By using distributed sensors, it is possible to separate the information obtained by the elements of the measuring device disposed on one side of the plane P2 from those disposed on the other side of that plane. In this way, the computer 41 computes the difference between the forces applied to the top part of the radome and the forces applied to its bottom part and deduces from this the angle of attack, which is a function of that difference. The parameters of this function are determined by computation by carrying out deformation simulations and/or by trial and error; they notably depend on the measuring devices chosen.

Figure 13:
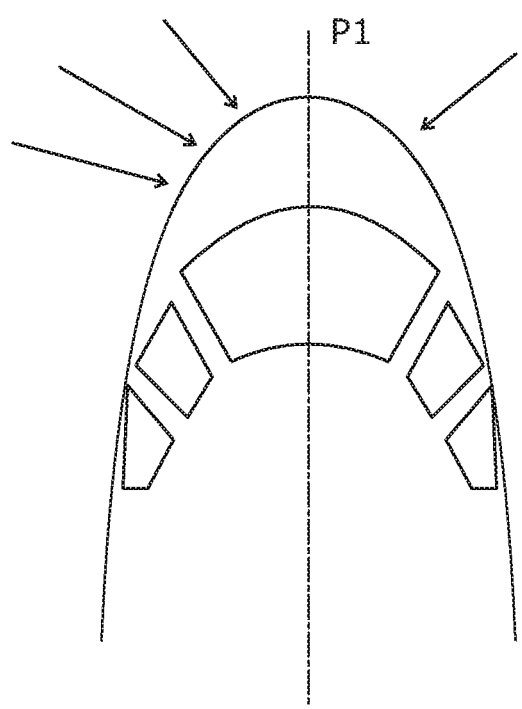
FIG. 13 is a simplified diagrammatic plan view in section of a nose of an aircraft according to the present invention showing flows of air that are asymmetrical relative to a vertical central plane.

To obtain the sideslip angle, the fact is exploited of having sensors distributed on either side of the plane P1 (as before, the sensors can be of any known technology type including those illustrated in the present application). An asymmetric flow on either side of the plane P1 as shown by the arrows in FIG. 13 leads to asymmetric deformations that can be measured by the sensors because they are distributed on either side of the plane P1. By using distributed sensors, it is possible to separate the information obtained by the elements of the measuring device disposed on one side of the plane P1 from those disposed on the other side of that plane. In this way, the computer 41 computes the difference between the forces applied to the left hand lateral part of the radome and the forces applied to the right hand lateral part thereof and deduces the sideslip angle from these. In the same way as before, the coefficients of proportionality are determined by computation by carrying out simulations of deformation or by modelling; they notably depend on the measuring devices chosen.

The measuring device according to the present invention thus offers an entirely new way of measuring flight parameters based on measuring the deformation of the radome in flight using optical fibers provided with deformation measurement systems such as Bragg grating, interferometric or distributed measurement systems.

The measuring device has no impact on the operation of the antennas accommodated in the radome. It moreover makes it possible to operate even in the event of icing up; in fact, even if ice is deposited on the radome, the aerodynamic loads remain present and exert their effects on the radome from which the measuring device can deduce the flight parameters.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for measuring at least one flight parameter of an aircraft including a radome, comprising:
   systems for measuring the deformation of a wall of the radome due to forces exerted by air on the radome, and
   a computer configured to compute, from deformation measurements obtained by said systems, said at least one flight parameter,
   the systems including at least one optical fiber carried by the radome provided with Bragg gratings, the at least one optical fiber including a plurality of Bragg gratings distributed over a length of the at least one optical fiber so as to distribute the Bragg gratings over the radome when the at least one optical fiber is installed, wherein the at least one optical fiber is isolated from the air by the radome.

2. The measuring device according to claim 1, wherein the at least one flight parameter is selected from the group consisting of an airspeed, a sideslip angle or an angle of attack of the aircraft, and any other parameter dependent on the airspeed, the sideslip angle or the angle of attack of the aircraft.

3. The measuring device according to claim 1, wherein the at least one optical fiber is integrated into an interior of the radome wall.

4. The measuring device according to claim 1, wherein a block of foam is provided between skins of the radome wall so as to join the skins, the block of foam being provided at a level of at least one Bragg grating configured for the measurement of the deformation.

5. The measuring device according to claim 1, including a system for isolating at least one Bragg grating from mechanical stresses.

6. The measuring device according to claim 5, wherein the isolating system comprises a sliding envelope provided around said at least one Bragg grating.

7. The measuring device according to claim 6, wherein a block of foam is provided between skins of the wall so as to join the skins, the block of foam being provided at the level of at least one Bragg grating configured for the measurement of the deformation, the sliding envelope being inserted between the skin and the block of foam.

8. The measuring device according to claim 7, wherein the envelope is positioned as close as possible to the Bragg grating associated with the block of foam.

9. The measuring device according to claim 6, wherein a block of foam is provided between skins of the wall so as to join the skins, the block of foam being provided at the level of at least one Bragg grating configured for the measurement of the deformation, the sliding envelope being fixed to an exterior surface of the wall at the level of the block of foam.

10. The measuring device according to claim 9, wherein the envelope is positioned as close as possible to the Bragg grating associated with the block of foam.

11. The measuring device according to claim 5, wherein the isolating system comprises a sample of skin superposed on the wall of the radome on which the Bragg grating is disposed to decouple the Bragg grating from the mechanical deformation.

12. A method of measuring at least one flight parameter from the group consisting of an airspeed, a sideslip angle, and an angle of attack of an aircraft including a radome, and any other parameter depending on the airspeed, the slideslip angle, the angle of attack of an aircraft including the radome, comprising:

measuring deformation of a wall of the radome stemming from forces of the air on the radome using at least systems carried by the radome enabling measurement of the deformation of the wall;

computing, via a computer, with deformation measurements obtained by said systems, the at least one flight parameter;

the systems comprising at least one optical fiber carried by the radome provided with Bragg gratings, the at least one optical fiber including a plurality of Bragg gratings distributed over a length of the at least one optical fiber so as to distribute the Bragg gratings over the radome when the at least one optical fiber is installed, the method further comprising:

measuring the temperature at a level of the Bragg gratings;

compensating the deformation measurement with the measured temperature;

measuring the interior and exterior temperature difference of the radome; and compensating the measurement of the deformation with the measured temperature difference, wherein the at least one optical fiber is isolated from the air by the radome.

13. The measuring method according to claim 12, further including a step of measuring the deformation at the level of a sample carrying a Bragg grating and a step of compensating the deformation measurement with the deformation measurement at a level of the sample.

14. The measuring method according to claim 13, further including a step of measuring a pressure difference between internal pressure of the radome and static pressure and a step of compensating the measurement of the deformation with the measured pressure difference.

15. The measuring method according to claim 12, further including a step of measuring a pressure difference between internal pressure of the radome and the static pressure and a step of compensating the measurement of the deformation with the measured pressure difference.

* * * * *